US006972789B1

(12) United States Patent
Aizawa

(10) Patent No.: US 6,972,789 B1
(45) Date of Patent: Dec. 6, 2005

(54) ELECTRONIC DEVICE, CONTROL METHOD THEREFOR, AND STORAGE MEDIUM

(75) Inventor: Takashi Aizawa, Yokohama (JP)

(73) Assignee: Csnon Kabushiki Kaisha, Tokyo (JP)

( * ) Notice: Subject to any disclaimer, the term of this patent is extended or adjusted under 35 U.S.C. 154(b) by 649 days.

(21) Appl. No.: 09/619,890

(22) Filed: Jul. 20, 2000

(30) Foreign Application Priority Data

Jul. 21, 1999 (JP) ................................ 11-206719

(51) Int. Cl.[7] ............................................. H04N 5/225
(52) U.S. Cl. ............................ 348/207.11; 348/333.02
(58) Field of Search ....................... 348/207.99, 207.1, 348/207.11, 211.6, 211.8, 211.9, 231.6, 552, 348/231.3, 333.01, 333.02; 396/300

(56) References Cited

U.S. PATENT DOCUMENTS 4,853,733 A * 8/1989 Watanabe et al. ........... 396/300
5,227,835 A * 7/1993 Anagnostopoulos ......... 396/49
5,402,170 A * 3/1995 Parulski et al. .......... 348/211.6
5,477,264 A * 12/1995 Sarbadhikari et al. ... 348/231.6
5,543,885 A * 8/1996 Yamano et al. ............. 396/300
5,675,358 A * 10/1997 Bullock et al. .......... 348/211.8
6,040,856 A * 3/2000 Sakaegi ................... 348/231.6
6,219,494 B1 * 4/2001 Watanabe ................... 396/300
6,442,349 B1 * 8/2002 Saegusa et al. ............. 396/300
6,819,355 B1 * 11/2004 Niikawa ................ 348/207.11
2001/0001563 A1 * 5/2001 Tomaszewski .............. 348/207
2001/0012071 A1 * 8/2001 Oeda et al. ............ 348/333.01

* cited by examiner

*Primary Examiner*—David L. Ometz
*Assistant Examiner*—Yogesh Aggarwal
(74) *Attorney, Agent, or Firm*—Morgan & Finnegan LLP

(57) ABSTRACT

A system including an external apparatus and digital camera allows the external apparatus to set a set value which cannot be set by the stand-alone digital camera. In response to a request from the external apparatus (computer), the digital camera updates an image sensing set value table in which set values used for image sensing are recorded (S502). If this set value cannot be set by the stand-alone digital camera ("NO" in step S506), a message representing it is displayed on a display section (S508).

8 Claims, 12 Drawing Sheets

FIG. 2

| | |
|---|---|
| AV VALUE | 5.6 |
| TV VALUE | 1/125 |
| EXPOSURE CORRECTION VALUE | +1/3 |
| MACRO | ON |
| ELECTRONIC FLASH | ON |
| TIMER | 5s |
| CONTINUOS SENSING SPEED | 3/s |

| | | | | | | | |
|---|---|---|---|---|---|---|---|
| AV VALUE | 2.5 | 5.6 | 11 | 22 | | | |
| TV VALUE | 1/500 | 1/250 | 1/125 | 1/60 | | | |
| EXPOSURE CORRECTION VALUE | -3/2 | -1 | -1/2 | 0 | +1/2 | +1 | +3/2 |
| MACRO | ON | OFF | | | | | |
| ELECTRONIC FLASH | ON | OFF | RED-EYE PREVENTION | | | | |
| TIMER | 2s | 4s | 10s | 30s | | | |

| | |
|---|---|
| MACRO | On, Off |
| ELECTRONIC FLASH | On, Off |
| IMAGE SENSING MODE | P, Av, Tv, Lock |
| | |

ELECTRONIC DEVICE, CONTROL METHOD THEREFOR, AND STORAGE MEDIUM

FIELD OF THE INVENTION

The present invention relates to an electronic device, control method therefor, and storage medium and, more particularly, to an electronic device which operates on the basis of a variable set value, a control method for the device, and a storage medium used for the control. The present invention can be applied to various electronic devices including a digital camera and silver halide film camera for sensing a still image or moving image, information processing apparatus, and portable terminal.

BACKGROUND OF THE INVENTION

Examples of electronic devices are digital cameras such as digital still cameras and digital video cameras each of which digitizes (encodes) image information or voice information and records it in a recording device in the apparatus or on a detachable recording medium.

An example of a system including such a digital camera is a system in which the digital camera and information processing apparatus (external apparatus) such as a computer are connected via a cable, and image information recorded on a recording medium fixed in the digital camera or detachable recording medium is transferred to the information processing apparatus.

In some such systems, internal parameters of the digital camera can be set by the information processing apparatus through the cable, or operation of the digital camera can be controlled from the information processing apparatus.

However, even in the system capable of setting the internal parameters of the digital camera by the information processing apparatus, only internal parameters settable in the stand-alone digital camera can be set from the information processing apparatus. This system cannot finely set or adjust the values in accordance with the application purpose of image sensing. For example, assume that the shutter speed settable in the stand-alone camera is a ½ step. For image sensing in a studio or the like, it is supposedly often required to change this step to ⅓ or ¼. However, this system cannot meet the requirement.

Additionally, in the prior art, when the stop value or shutter speed of the digital camera is set from the information processing apparatus, and the digital camera is disconnected from the information processing apparatus and used as a stand-alone device, the user may be confused because the digital camera operates in the mode set by the information processing apparatus.

Furthermore, in the prior art, for example, the following restrictions may be imposed on use of such a system in which the information processing apparatus and digital camera are connected. First, in some systems, unless the user sets the digital camera in the "PC connection mode" by operating the operating section, the digital camera cannot be controlled and operated by the information processing apparatus. Second, in some systems, while the digital camera and information processing apparatus are being connected, operation of the digital camera main body is invalidated to disable image sensing by direct operation of the main body. Third, in some systems, even when the digital camera main body connected to the information processing apparatus can be directly operated, only image sensing based on contents set by the information processing apparatus is possible.

SUMMARY OF THE INVENTION

It is an object of the present invention to, e.g., improve the convenience for use of an electronic device having a function of connecting an external apparatus.

According to the first aspect of the present invention, there is provided an electronic device operating on the basis of a variable set value, comprising an operating section which inputs setting instruction information, a reception section which receives the setting instruction information from an external apparatus, and a setting section which determines a set value on the basis of the setting instruction information supplied from said operating section or said reception section and storing the set value, wherein a set value which can be set by said setting section includes a set value to be set on the basis of setting instruction information which can be supplied from only the external apparatus.

The electronic device according to the first aspect of the present invention preferably further comprises a display control section which represents that the set value set by the setting section is not a set value which can be set in accordance with the setting instruction information supplied from said operating section.

Preferably, the electronic device according to the first aspect of the present invention further comprises a display section which displays at least part of set value information corresponding to the set value determined by said setting section, and the display control section displays an index on said display section.

The electronic device according to the first aspect of the present invention preferably further comprises a recorder which records an image on a recording medium in accordance with the set value set by the setting section.

In the electronic device according to the first aspect of the present invention, the recording medium preferably comprises a memory.

In the electronic device according to the first aspect of the present invention, the recording medium preferably comprises a film.

In the electronic device according to the first aspect of the present invention, the device preferably comprises a camera.

According to the second aspect of the present invention, there is provided an electronic device operating on the basis of a variable set value, comprising an operating section which inputs setting instruction information, a reception section which receives the setting instruction information from an external apparatus, a setting section which determines a set value on the basis of the setting instruction information supplied from said operating section or said reception section and storing the set value, a display section capable of displaying at least set value information corresponding to the set value set by said setting section on the basis of the setting instruction information supplied from said operating section, and a display control section which represents that the set value information corresponding to the set value set by said setting section cannot be displayed on said display section.

In the electronic device according to the second aspect of the present invention, the display control section displays an index on the display section.

The electronic device according to the second aspect of the present invention preferably further comprises a recorder which records an image on a recording medium in accordance with the set value set by the setting section.

In the electronic device according to the second aspect of the present invention, the recording medium preferably comprises a memory.

In the electronic device according to the second aspect of the present invention, the recording medium preferably comprises a film.

In the electronic device according to the second aspect of the present invention, the device preferably comprises a camera.

According to the third aspect of the present invention, there is provided an electronic device operating on the basis of a variable set value, comprising an operating section which inputs setting instruction information, a reception section which receives the setting instruction information from an external apparatus, a setting section which determines a set value on the basis of the setting instruction information supplied from said operating section or said reception section and storing the set value, and a display control section which represents that the setting instruction information is supplied from the external apparatus.

The electronic device according to the third aspect of the present invention preferably further comprises a display section for displaying at least part of set value information corresponding to the set value determined by the setting section.

In the electronic device according to the third aspect of the present invention, the display control section displays an index on the display section.

The electronic device according to the third aspect of the present invention preferably further comprises a recorder which records an image on a recording medium in accordance with the set value set by the setting section.

In the electronic device according to the third aspect of the present invention, the recording medium preferably comprises a memory.

In the electronic device according to the third aspect of the present invention, the recording medium preferably comprises a film.

In the electronic device according to the third aspect of the present invention, the device preferably comprises a camera.

According to the fourth aspect of the present invention, there is provided an electronic device operating on the basis of a variable set value, comprising a mechanical operation indicating section which receives setting instruction information in accordance with a position of a movable portion and mechanically indicates a set state related to the set information, a reception section which receives setting instruction information from an external apparatus, and a setting section which determines a set value on the basis of the setting instruction information supplied from said mechanical operation indicating section or said reception section and storing the set value, wherein said setting section rejects a set request related to the setting instruction information when the setting instruction information supplied from said reception section is setting instruction information for a set item which should be set by said mechanical operation indicating section.

The electronic device according to the fourth aspect of the present invention preferably further comprises a notification section, when the setting section rejects the set request related to the setting instruction information supplied from the external apparatus, notifying the external apparatus of a set value which has already been set for the set item related to the setting instruction information.

In the electronic device according to the fourth aspect of the present invention, the mechanical operation indicating section preferably comprises a dial switch capable of indicating the set state.

In the electronic device according to the fourth aspect of the present invention, the mechanical operation indicating section preferably comprises a slide switch capable of indicating the set state.

The electronic device according to the fourth aspect of the present invention preferably further comprises a recorder which records an image on a recording medium in accordance with the set value set by the setting section.

In the electronic device according to the fourth aspect of the present invention, the recording medium preferably comprises a memory.

In the electronic device according to the fourth aspect of the present invention, the recording medium preferably comprises a film.

In the electronic device according to the fourth aspect of the present invention, the device preferably comprises a camera.

According to the fifth aspect of the present invention, there is provided en electronic device operating on the basis of a variable set value, comprising an operating section which inputs setting instruction information, a reception section which receives the setting instruction information from an external apparatus, and a setting section, in a first mode, determining a set value in accordance with the setting instruction information supplied from said operating section and storing the set value in a first table, and in a second mode, determining a set value in accordance with the setting instruction information supplied from said reception section and storing the set value in a second table.

The electronic device according to the fifth aspect of the present invention preferably further comprises a selection section which detects whether the reception section is connected to the external apparatus, continuously selecting the first mode when the reception section is not connected to the external apparatus, and continuously selecting the second mode when the reception section is connected to the external apparatus.

The electronic device according to the fifth aspect of the present invention preferably further comprises a section which displays information representing the mode selected by the selection section.

The electronic device according to the fifth aspect of the present invention preferably further comprises a recorder which records an image on a recording medium in accordance with the set value set by the setting section.

In the electronic device according to the fifth aspect of the present invention, the recording medium preferably comprises a memory.

In the electronic device according to the fifth aspect of the present invention, the recording medium preferably comprises a film.

In the electronic device according to the fifth aspect of the present invention, the device preferably comprises a camera.

According to the sixth aspect of the present invention, there is provided an electronic device operating on the basis of a variable set value, comprising an operating section which input setting instruction information and operation instruction, a reception section which receives setting instruction information and operation instruction from an external apparatus, a determination section which determines a set value on the basis of the setting instruction information supplied from said operating section or said reception section, a first table for storing the set value determined by said determination section on the basis of the setting instruction information supplied from said operating section, a second table for storing the set value determined by said determination section on the basis of the setting instruction information supplied from said reception section, and an execution section which executes predetermined operation in response to the operation instruction, wherein when the operation instruction is based on operation of said operating section, said execution section executes the predetermined operation in accordance with the set value stored in said first table, and when the operation instruction is supplied from the external apparatus through said reception section, said execution section executes the predetermined operation in accordance with the set value stored in said second table.

In the electronic device according to the sixth aspect of the present invention, the execution section comprises a recorder which records an image on a recording medium.

In the electronic device according to the sixth aspect of the present invention, the recording medium preferably comprises a memory.

In the electronic device according to the sixth aspect of the present invention, the recording medium preferably comprises a film.

In the electronic device according to the sixth aspect of the present invention, the device preferably comprises a camera.

According to the seventh aspect of the present invention, there is provided a method of controlling an electronic device having an operating section for inputting setting instruction information and a reception section for receiving setting instruction information from an external apparatus, comprising the setting step of determining a set value on the basis of the setting instruction information supplied from the operating section or the reception section and storing the set value, wherein a set value which can be set in the setting step includes a set value to be set on the basis of setting instruction information which can be supplied from only the external apparatus.

According to the eighth aspect of the present invention, there is provided a method of controlling an electronic device having an operating section for inputting setting instruction information, a reception section for receiving setting instruction information from an external apparatus, and a display section, comprising the setting step of determining a set value on the basis of the setting instruction information supplied from the operating section or the reception section and storing the set value, and the display step of displaying, on the display section or another display section, an index representing that set value information corresponding to the set value set in the setting step cannot be displayed on the display section.

According to the ninth aspect of the present invention, there is provided a method of controlling an electronic device having an operating section for inputting setting instruction information and a reception section for receiving setting instruction information from an external apparatus, comprising the setting step of determining a set value on the basis of the setting instruction information supplied from the operating section or the reception section and storing the set value, and the display step of displaying an index representing that the setting instruction information is supplied from the external apparatus.

According to the tenth aspect of the present invention, there is provided a method of controlling an electronic device having a mechanical operation indicating section for receiving setting instruction information in accordance with a position of a movable portion and mechanically indicating a set state related to the set information, and a reception section for receiving setting instruction information from an external apparatus, comprising the setting step of determining a set value on the basis of the setting instruction information supplied from the mechanical operation indicating section or the reception section and storing the set value, wherein the setting step comprises rejecting a set request related to the setting instruction information when the setting instruction information supplied from the reception section is setting instruction information for a set item which should be set by the mechanical operation indicating section.

According to the eleventh aspect of the present invention, there is provided a method of controlling an electronic device having an operating section for inputting setting instruction information and a reception section for receiving setting instruction information from an external apparatus, comprising the setting step of, in a first mode, determining a set value in accordance with the setting instruction information supplied from the operating section and storing the set value in a first table, and in a second mode, determining a set value in accordance with the setting instruction information supplied from the reception section and storing the set value in a second table.

According to the twelfth aspect of the present invention, there is provided a method of controlling an electronic device having an operating section for inputting setting instruction information and operation instruction, and a reception section for receiving setting instruction information and operation instruction from an external apparatus, comprising the determination step of determining a set value on the basis of the setting instruction information supplied from the operating section or the reception section, the first storage step of storing, in a first table, the set value determined in the determination step on the basis of the setting instruction information supplied from the operating section, the second storage step of storing, in a second table, the set value determined in the determination step on the basis of the setting instruction information supplied from the reception section, and the execution step of executing predetermined operation in response to the operation instruction, wherein the execution step comprises, when the operation instruction is based on operation of the operating section, executing the predetermined operation in accordance with the set value stored in the first table, and when the operation instruction is supplied from the external apparatus through the reception section, executing the predetermined operation in accordance with the set value stored in the second table.

According to the thirteenth aspect of the present invention, there is provided a storage medium which stores a control program for controlling an electronic device having an operating section for inputting setting instruction information and a reception section for receiving setting instruction information from an external apparatus, the control program comprising the setting step of determining a set value on the basis of the setting instruction information supplied from the operating section or the reception section and storing the set value, wherein a set value which can be set in the setting step includes a set value to be set on the basis of setting instruction information which can be supplied from only the external apparatus.

According to the fourteenth aspect of the present invention, there is provided a storage medium which stores a control program for controlling an electronic device having an operating section for inputting setting instruction information, a reception section for receiving setting instruction information from an external apparatus, and a display section, the control program comprising the setting step of determining a set value on the basis of the setting instruction information supplied from the operating section or the reception section and storing the set value, and the display step of displaying, on the display section or another display section, an index representing that set value information corresponding to the set value set in the setting step cannot be displayed on the display section.

According to the fifteenth aspect of the present invention, there is provided a storage medium which stores a control program for controlling an electronic device having an operating section for inputting setting instruction information and a reception section for receiving setting instruction information from an external apparatus, the control program comprising the setting step of determining a set value on the basis of the setting instruction information supplied from the operating section or the reception section and storing the set value, and the display step of displaying an index representing that the setting instruction information is supplied from the external apparatus.

According to the sixteenth aspect of the present invention, there is provided a storage medium which stores a control program for controlling an electronic device having a mechanical operation indicating section for receiving setting instruction information in accordance with a position of a movable portion and mechanically indicating a set state related to the set information, and a reception section for receiving setting instruction information from an external apparatus, the control program comprising the setting step of determining a set value on the basis of the setting instruction information supplied from the mechanical operation indicating section or the reception section and storing the set value, wherein the setting step comprises rejecting a set request related to the setting instruction information when the setting instruction information supplied from the reception section is setting instruction information for a set item which should be set by the mechanical operation indicating section.

According to the seventeenth aspect of the present invention, there is provided a storage medium which stores a control program for controlling an electronic device having an operating section for inputting setting instruction information and a reception section for receiving setting instruction information from an external apparatus, the control program comprising the setting step of, in a first mode, determining a set value in accordance with the setting instruction information supplied from the operating section and storing the set value in a first table, and in a second mode, determining a set value in accordance with the setting instruction information supplied from the reception section and storing the set value in a second table.

According to the eighteenth aspect of the present invention, there is provided a storage medium which stores a control program for controlling an electronic device having an operating section for inputting setting instruction information and operation instruction, and a reception section for receiving setting instruction information and operation instruction from an external apparatus, the control program comprising the determination step of determining a set value on the basis of the setting instruction information supplied from the operating section or the reception section, the first storage step of storing, in a first table, the set value determined in the determination step on the basis of the setting instruction information supplied from the operating section, the second storage step of storing, in a second table, the set value determined in the determination step on the basis of the setting instruction information supplied from the reception section, and the execution step of executing predetermined operation in response to the operation instruction, wherein the execution step comprises, when the operation instruction is based on operation of the operating section, executing the predetermined operation in accordance with the set value stored in the first table, and when the operation instruction is supplied from the external apparatus through the reception section, executing the predetermined operation in accordance with the set value stored in the second table.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a table showing an example of a list (image sensing set value table) of set values (parameters), related to image sensing, of set items for a digital camera;

FIG. 3 is a table showing an example of a list (stand-alone set value table) of set values which can be set by operating the operating section of the digital camera;

FIG. 8 is a table showing an example of a list (mechanical operation indicating table) of items which should be set by a mechanical operation indicating section;

DETAILED DESCRIPTION OF THE PREFERRED EMBODIMENTS

Preferred embodiments of the present invention will be described below.

First Embodiment

Figure 1:
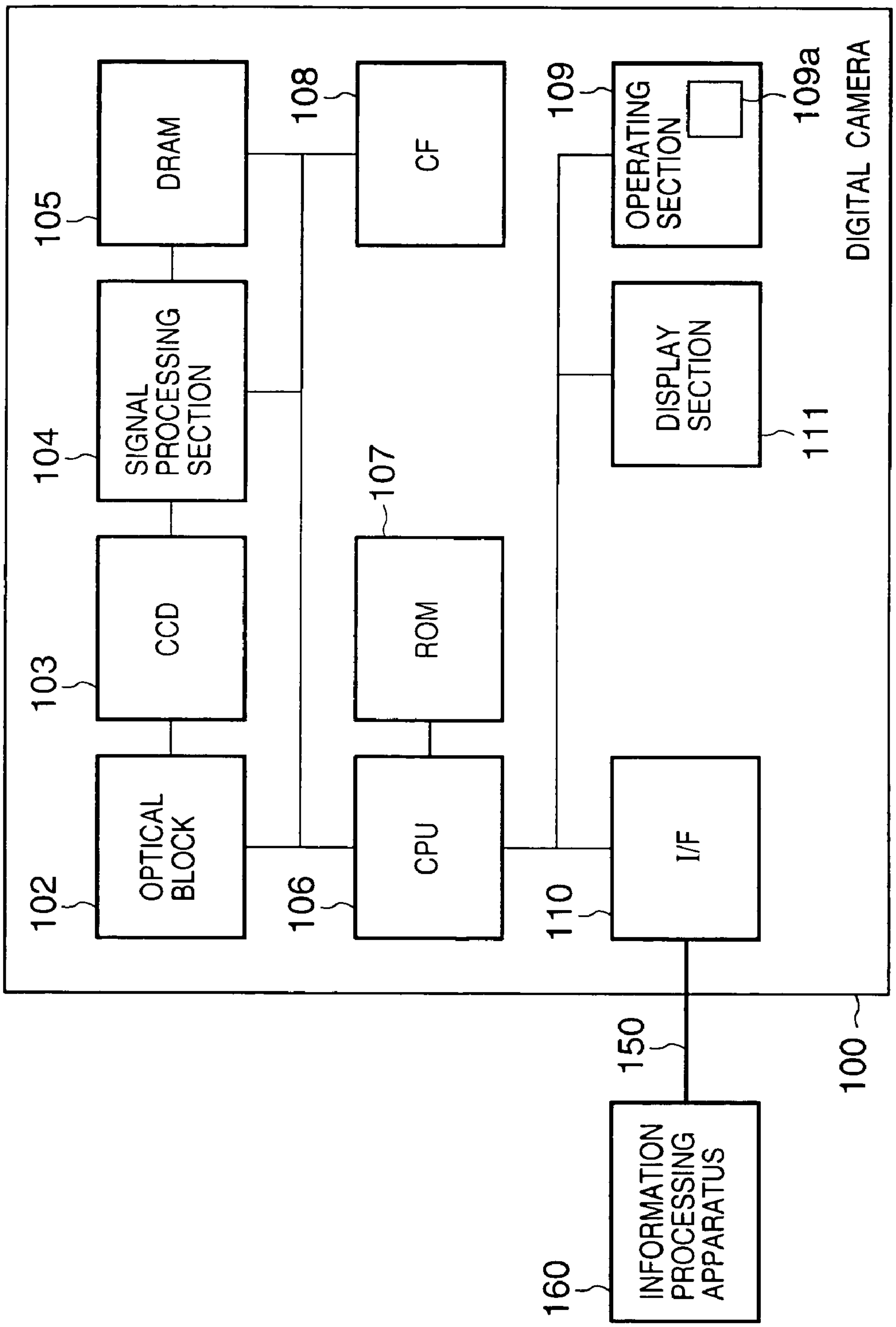
FIG. 1 is a block diagram showing the schematic arrangement of a digital camera system according to a preferred embodiment of the present invention.

FIG. 1 is a block diagram showing the schematic arrangement of a digital camera system according to a preferred embodiment of the present invention. This digital camera system includes a digital camera 100 and information processing apparatus 160, which are connected via a cable 150 as needed.

The information processing apparatus 160 has a function of processing and managing image data sensed by the digital camera 100. The information processing apparatus 160 also has a function of setting various internal parameters (set values) of the digital camera 100. The information processing apparatus 160 can be constructed by, e.g., a computer such as a personal computer. The information processing apparatus 160 includes, e.g., a CPU, primary storage device (e.g., a RAM), secondary storage device (e.g., a hard disk), operation unit (e.g., a keyboard and mouse), and display unit (e.g., a CRT or liquid crystal display unit).

The digital camera 100 includes constituent elements 102 to 111. In the digital camera 100, an object image is formed on the light-receiving surface of the CCD 103 through the optical block 102 including a lens and low-pass filter. The optical information is converted into an analog electrical signal by the CCD 103 and supplied to the signal processing section 104. The signal processing section 104 converts the analog electrical signal supplied from the CCD 103 into a digital electrical signal, executes predetermined image processing (e.g., shading correction), compresses the data as needed, and records it on the detachable recording medium 108 such as a CF card (Compact Flash memory Card). This sequence is controlled by the CPU 106, and software therefor is stored in the ROM 107.

The digital camera 100 also has the I/F section 110 for communication with the information processing apparatus 160, the operating section 109 including the release switch 109*a*, dial switch (FIG. 6), and slide switch (FIG. 7) for operation of the stand-alone digital camera 100, and the display section (e.g., a liquid crystal display section) 111 for displaying various settings and states of the digital camera 100.

FIG. 2 is a table showing an example of a list (image sensing set value table) of set values (parameters), related to image sensing, of set items for the digital camera 100. Set values set when the user operates the operating section 109 of the digital camera 100 or set values set by the information processing apparatus 160 are held in the DRAM 105 of the digital camera 100 in the form of an image sensing set value table 200 as shown in FIG. 2.

In the example shown in FIG. 2, the AV (stop) value is 5.6 m TV (shutter speed) value is 1/125 sec, exposure correction is +1/3, macro image sensing is ON, electronic flash light emission is ON, timer image sensing is 5 sec, and continuous sensing speed is 3 frames per sec.

In this embodiment, the DRAM 105 includes an area for temporarily storing sensed image data and a work area used by the CPU 106 to execute a program. Hence, in this embodiment, the image sensing set value table 200 shown in FIG. 2 is stored in the DRAM 105. However, an image data memory and work area memory may be separately prepared.

FIG. 3 is a table showing an example of a list (stand-alone set value table) of set values which can be set by operating the operating section 109 of the digital camera 100. The set values included in a stand-alone set value table 300 can be displayed on the display section 111 using, e.g., numbers, characters, symbols, and graphic patterns.

For example, exposure correction will be described. In this digital camera 100, an exposure correction amount of −3/2, −1, −1/2, 0, +1/2, +1, or +3/2 can be set by operating the operating section 109. Any other exposure correction amount is set in accordance with an instruction from the information processing apparatus 160.

Figure 5:
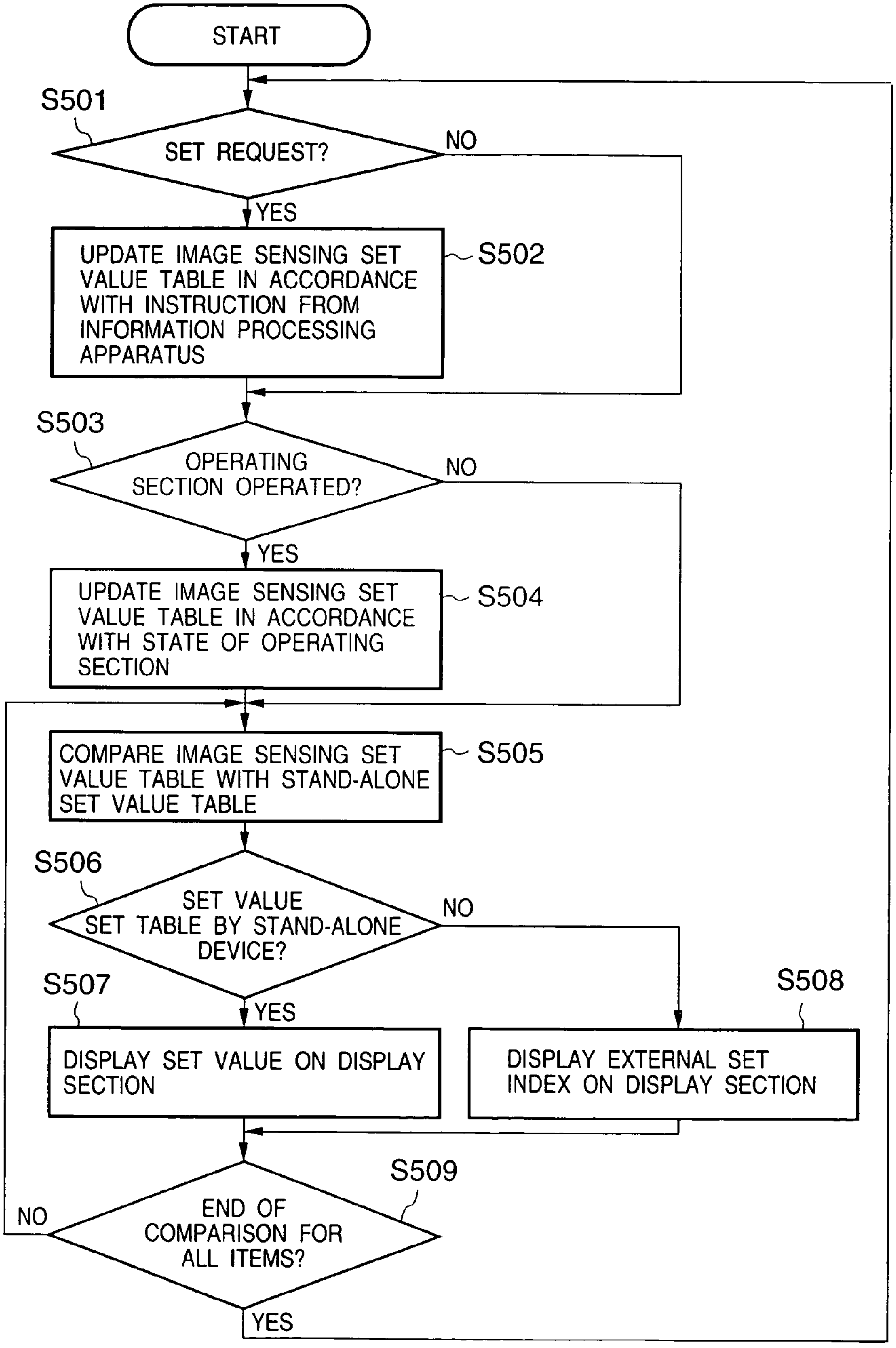
FIG. 5 is a flow chart showing the flow of processing related to setting of the digital camera in the first embodiment of the present invention.

FIG. 5 is a flow chart showing the flow of processing related to setting of the digital camera 100 in the first embodiment of the present invention. Processing shown in this flow chart is controlled by the CPU 106 in accordance with a program stored in the ROM 107.

First, it is confirmed in step S501 whether a request (set request) for setting a set value (parameter) of the digital camera 100 is generated by the information processing apparatus 160 connected through the cable 150. If YES in step S501, the flow advances to step S502. If NO in step S501, the flow advances to step S503.

In step S502, the image sensing set value table 200 shown in FIG. 2 is updated in accordance with information transferred from the information processing apparatus 160. For example, the TV value is updated from 1/125 sec to 1/250 sec.

It is confirmed in step S503 whether the operating section 109 of the digital camera 100 is operated. If YES in step S503, the flow advances to step S504. If NO in step S503, the flow advances to step S505.

In step S504, the image sensing set value table 200 shown in FIG. 2 is updated in accordance with the state of the operating section 109. For example, electronic flash light emission is updated from ON to OFF.

In step S505, the image sensing set value table 200 shown in FIG. 2 is compared with the stand-alone set value table 300 shown in FIG. 3. More specifically, it is determined in step S505 whether the value (e.g., 5.6) set for an item (e.g., AV value) sequentially selected in the image sensing set value table 200 matches any one of a plurality of values (e.g., 2.5, 5.6, 11, and 22) of the corresponding item (e.g., AV value) of the stand-alone set value table 300. That is, it is determined in step S505 whether the set value for the corresponding item recorded in the image sensing set value table 200 is a value that can be set by operating the operating section 109 of the digital camera 100. If the set value for the corresponding item stored in the image sensing set value table 200 is a value that can be set by operating the operating section 109 (value that can be set by the stand-alone camera), the flow advances to step S507. If the set value can be set only in accordance with an instruction from the information processing apparatus 160, the flow advances to step S508.

In step S507, display of the corresponding set item displayed on the display section 111 is updated. On the other hand, in step S508, if the set value for the corresponding set item is displayed on the display section 111, the display is turned off, and instead, an index (external setting index) representing that the set value of the corresponding set item is a value set in accordance with an instruction from the information processing apparatus 160 is displayed.

In step S509, it is confirmed whether processing in steps S505 to S508 is ended for all set items of the image sensing set value table 200 shown in FIG. 2. If NO in step S509, the next set item (e.g., TV value) is selected as an item to be processed, and the flow returns to step S505. If YES in step S509, the flow returns to step S501.

Figure 4:
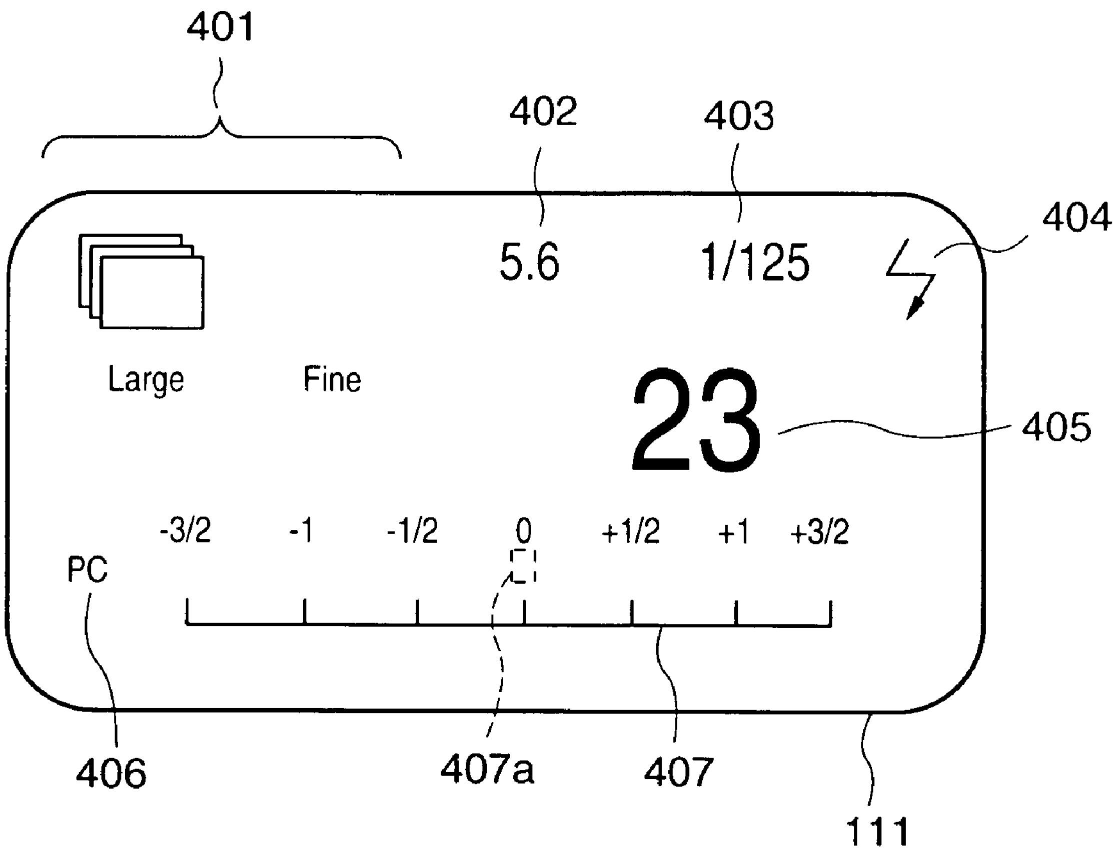
FIG. 4 is a view showing a display example on a display section.

FIG. 4 is a view showing a display example on the display section 111. Referring to FIG. 4, reference numeral 401 denotes a compression mode; 402, an AV value; 403, a TV value; 404, an electronic flash mode; 405, the number of sensed images (or the number of sensible images); 406, an external set index; and 407, an exposure correction amount graph. For example, when the exposure correction amount is set to a value that cannot be set by the operating section 109, the external set index 406 is displayed on the display section 111 in place of an exposure correction amount index 407*a*.

Only the external set index for the exposure correction amount has been described above. However, another external set index may be displayed for another item (e.g., AV value).

Alternatively, one external set index may be commonly used for a plurality of set items (e.g., AV value, TV value, and exposure correction amount). In this case, preferably, for items whose set values can be displayed on the display section 111, the set values are displayed on the display section 111, and for the remaining set items, the external set index is displayed on the display section 111 instead of displaying the set values.

Image sensing is executed in accordance with the set values recorded in the set items of the image sensing set value table shown in FIG. 2.

In the above description, it is determined in step S506 whether the set value recorded in the image sensing set value table 200 is a value that cannot be set by the stand-alone digital camera 100. If the set value is a value that cannot be set by the stand-alone digital camera 100, the external set index is displayed on the display section 111 in place of the set value because it cannot be displayed on the display section 111. However, when the set value can be displayed on the display section 111, for example, when the display section 111 has an LED or LCD for segment display and therefore a high degree of freedom in displaying numerical values, the set value may be displayed on the display section 111 in place of the external set index or together with the external set index. This processing can be realized by changing processing shown in the above flow chart in the following way. In place of the stand-alone set value table 300, a list (displayable set value table) of set values that can be displayed on the display section 111 is prepared and compared with the image sensing set value table in step S506 to determine whether the set value can be displayed on the display section 111. If YES in step S506, step S507 (or steps S507 and S508) is executed. If NO in step S506, step S508 is executed.

As described above, according to the first embodiment, contents that cannot be set by the stand-alone digital camera 100 can be set from the information processing apparatus 160 as an external apparatus. In addition, the user can be made to recognize that the setting has been done.

The above embodiment is related to a system which displays the external set index when a set value that cannot be set by the stand-alone digital camera 100 or cannot be displayed on the display section 111 is set in the digital camera 100 by the information processing apparatus 160. Instead, the external set index may always be displayed when a set value of the digital camera 100 is set by the information processing apparatus 160. In this case, when the set value can be displayed on the display section 111, the set value is preferably displayed together. In this case, the user can quickly recognize whether the set value is set by the information processing apparatus 160 or the operating section 109 of the digital camera 100. In this system, for example, information (e.g., a flag) representing that the corresponding set value is set in accordance with an instruction from the information processing apparatus 160 or operating section 109 is added to the image sensing set value table 200, and display of the external set index is controlled in accordance with the flag.

Second Embodiment

The second embodiment of the present invention will be described below with reference to FIG. 1 and FIGS. 6 to 9.

Figure 6:
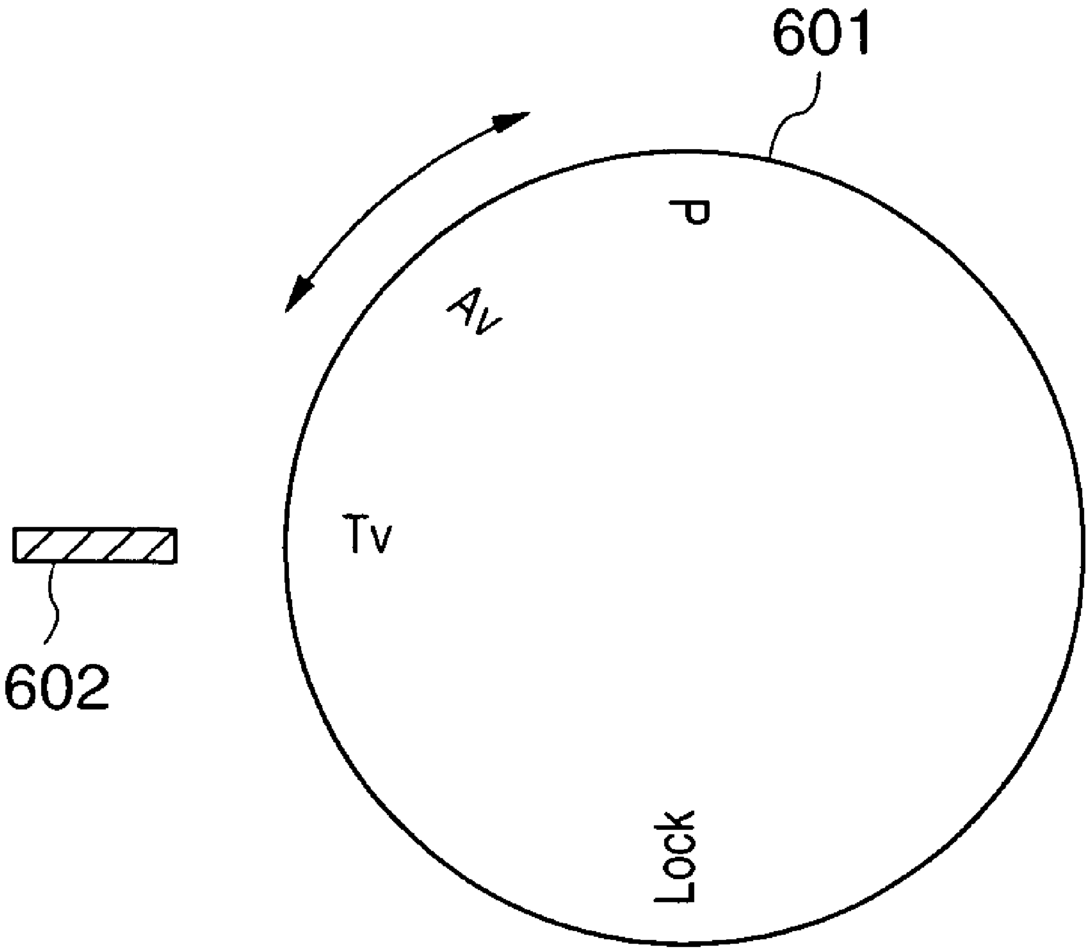
FIG. 6 is a view showing a dial switch as part of the operating section.

FIG. 6 is a view showing a dial switch as part of an operating section 109. A dial switch 601 sets the image sensing mode to one of P (program mode), Av (stop priority mode), and Tv (shutter speed priority mode) and also serves as a power switch (OFF at “Lock”). The user rotates the dial switch 601 to match the symbol of a desired mode (P, Av, Tv. or Lock) with an index 602, thereby selecting the mode.

Figure 7:
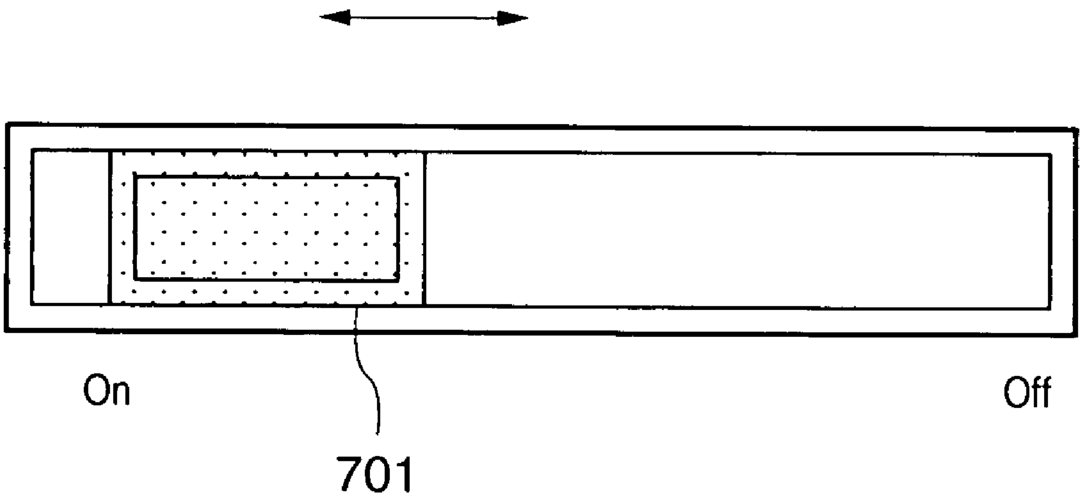
FIG. 7 is a view showing a slide switch as part of the operating section.

FIG. 7 is a view showing a slide switch as part of the operating section 109. A slide switch 701 is used to turn on/off macro image sensing or electronic flash light emission. In this embodiment, two slide switches are separately prepared to turn on/off macro image sensing and electronic flash light emission.

The dial switch 601 or slide switch 701 is an example of a mechanical operation indicating section for determining the set state (set value) of a digital camera 100 in accordance with the mechanical position (angle) of the switch and also causing the user to recognize the set state (set value). If the set value of an item which should be set by such a mechanical operation indicating section can be changed to another set value in accordance with an instruction from an information processing apparatus 160 as an external apparatus, the user can hardly quickly recognize whether the set contents indicated by the mechanical operation indicating section are actual set contents.

In the second embodiment, this problem is solved by rejecting (inhibiting) setting from the information processing apparatus 160 for an item which should be set by the mechanical operation indicating section.

FIG. 8 is a table showing an example of a list (mechanical operation indicating table) of items which should be set by the mechanical operation indicating section. Right columns in FIG. 8 show set values which can be selected for each item for the descriptive convenience. A mechanical operation display table 800 is stored in a ROM 107 in advance.

Figure 9:
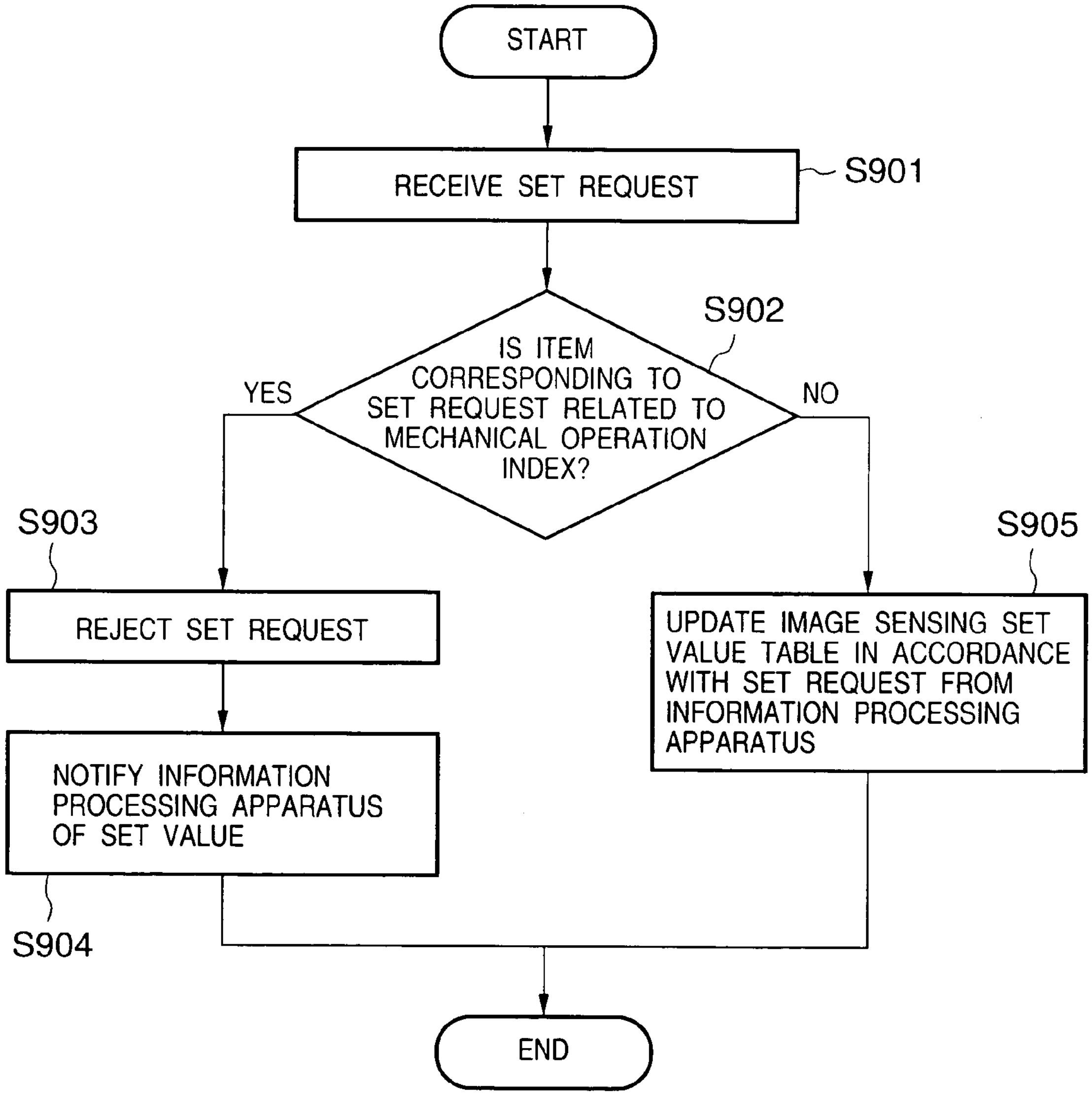
FIG. 9 is a flow chart showing the flow of processing related to setting of a digital camera in the second embodiment of the present invention.

FIG. 9 is a flow chart showing the flow of processing associated with setting of the digital camera 100 in the second embodiment of the present invention. Processing shown in this flow chart is controlled by a CPU 106 in accordance with a program stored in the ROM 107. This processing is started on the basis of a request (set request) for requesting setting a set value of the digital camera 100 from the information processing apparatus 160.

First, in step S901, a set request is received from the information processing apparatus 160. In step S902, it is determined by looking up the mechanical operation indicating table 800 shown in FIG. 8 whether the set item represented by the set request is a set item that should be set by the mechanical operation indicating section (601 or 701). If YES in step S902, the flow advances to step S903. If NO in step S902, the flow advances to step S905.

In step S903, response information representing the set request is rejected is returned to the information processing apparatus 160. An image sensing set value table 200 is looked up to confirm the set value for the item, and the information processing apparatus 160 is notified of the set value. The information processing apparatus 160 can display, using its display unit or the like, a message representing that the item cannot be set from the information processing apparatus 160 and/or the current set value for the item in the digital camera 100.

In step S905, the image sensing set value table 200 is updated in accordance with the set request from the information processing apparatus 160. Subsequent image sensing is executed in accordance with the conditions recorded in the image sensing set value table 200.

The first embodiment and second embodiment may be combined. For example, processing shown in the flow chart of FIG. 9 can be effectively executed in place of step S502 of the flow chart shown in FIG. 5 according to the first embodiment. In this case, both the effects of the first and second embodiments can be obtained.

As described above, according to the second embodiment, the user can be prevented from misunderstanding the set value due to incoincidence between the actual set value and the set value indicated by the mechanical operation indicating section.

In addition, according to the second embodiment, the mechanical operation indicating table is held by the digital camera 100. For this reason, as the software (driver) on the information processing apparatus 160 side, common software can be used for a plurality of digital cameras having different specifications (set items).

Furthermore, the user can recognize the set item and set value assigned to the mechanical operation indicating section when he/she is operating the information processing apparatus 160.

Third Embodiment

Figure 10:
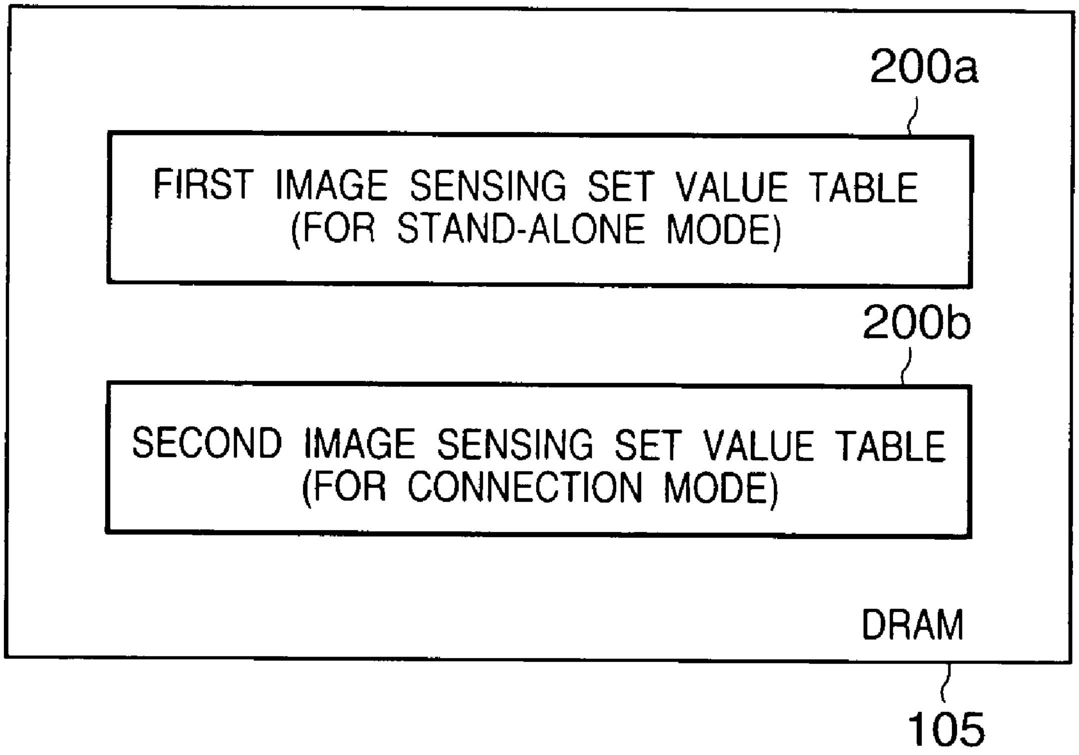
FIG. 10 is a view showing first and second image sensing set value tables stored in a DRAM.

The third embodiment of the present invention will be described below with reference to FIG. 1 and FIGS. 10 and 11.

This embodiment has a mode (stand-alone mode) in which a set item of a digital camera 100 is set (updated) in accordance with an instruction supplied through an operating section 109 of the digital camera 100, and operation is performed in accordance with the setting, and a mode (connection mode) in which a set item of the digital camera 100 is set (updated) in accordance with an instruction supplied from an information processing apparatus 160, and operation is performed in accordance with the setting. In this embodiment, the modes are switched on the basis of whether the information processing apparatus 160 is connected to the digital camera 100.

In this embodiment, the digital camera 100 has a first image sensing set value table 200*a* and second image sensing set value table 200*b*, each of which is similar to an image sensing set value table 200 shown in FIG. 2. The first image sensing set value table 200*a* and second image sensing set value table 200*b* are held by, e.g., a DRAM 105, as shown in FIG. 10. When the DRAM 105 is driven by battery backup, or a nonvolatile memory for holding the first image sensing set value table 200*a* and second image sensing set value table 200*b* is prepared, an arrangement for holding the set values even in case of power failure can be effectively employed.

The first image sensing set value table 200*a* is used in the stand-alone mode. The second image sensing set value table 200*b* is used in the connection mode. Even when the mode is changed, the contents of the image sensing set value table for the mode before change are held.

Figure 11:
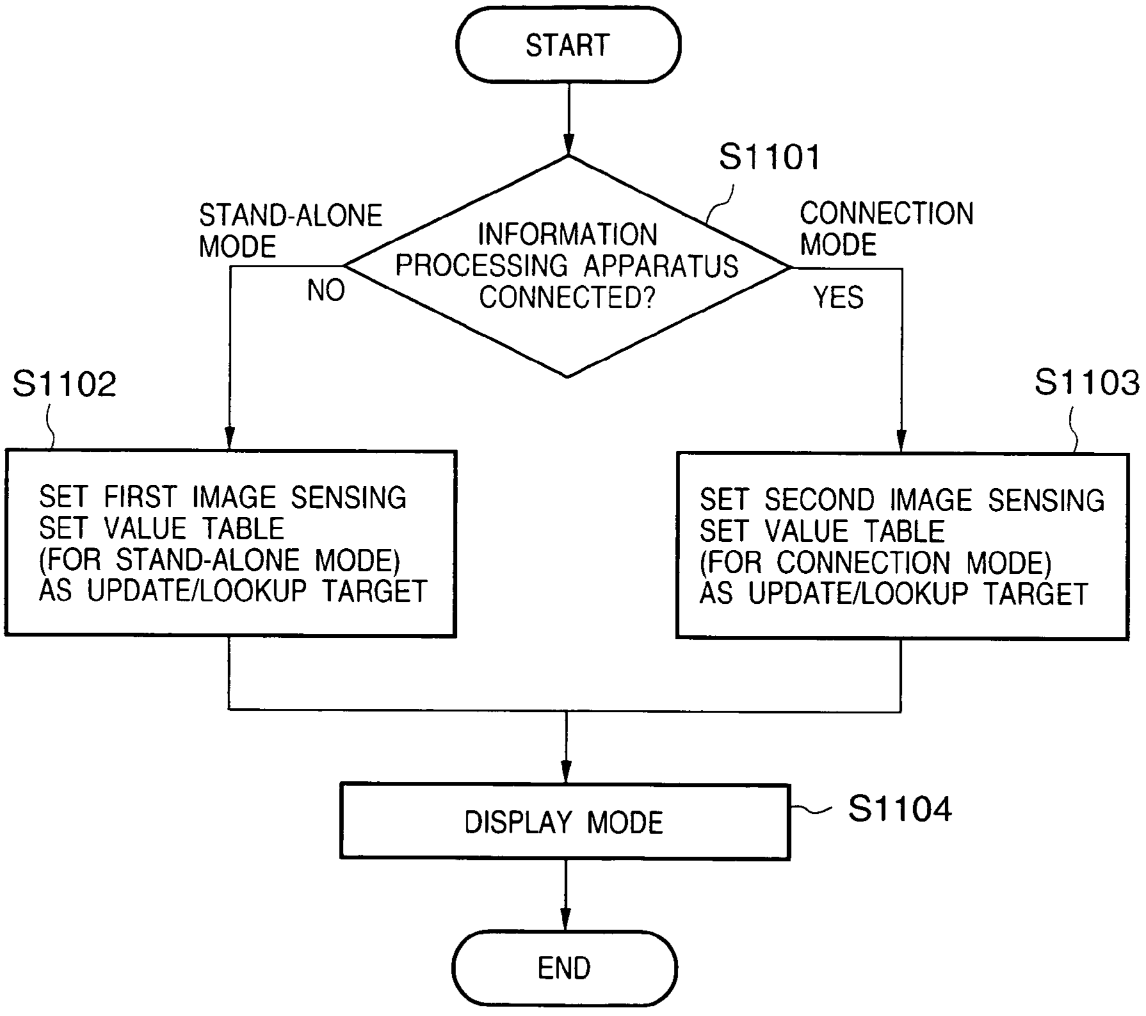
FIG. 11 is a flow chart showing the flow of processing associated with a mode change in the third embodiment of the present invention.

FIG. 11 is a flow chart showing the flow of processing associated with a mode change in the third embodiment of the present invention. Processing shown in this flow chart is controlled by a CPU 106 in accordance with a program stored in a ROM 107.

First, in step S1101, it is detected whether the information processing apparatus 160 is connected to the digital camera 100 and, more specifically, to an I/F 110 of the digital camera 100. If NO in step S1101 (stand-alone mode), the flow advances to step S1102. If YES in step S1101 (connection mode), the flow advances to step S1103. The connection can be detected either by a detection section (sensor) in hardware or by detection processing using software.

In step S1102, the first image sensing set value table 200*a* is set as a lookup target in setting (updating) a set item and image sensing. Thus, the digital camera 100 is set in the stand-alone mode. Unless the mode is changed later to the connection mode, a set item in the first image sensing set value table 200*a* is set in accordance with an instruction supplied through the operating section 109 of the digital camera 100. In addition, image sensing is executed by looking up the first image sensing set value table 200*a*.

In this embodiment, since the stand-alone mode is selected when the information processing apparatus 160 is not connected to the digital camera 100, no set request is received from the information processing apparatus 160 in the stand-alone mode. However, when mode switching is done by another means (e.g., a switch), a set request may be received from the information processing apparatus 160. In this case, the set request is ignored.

On the other hand, in step S1103, the second image sensing set value table 200*b* is set as a lookup target in setting (updating) a set item and image sensing. Thus, the digital camera 100 is set in the connection mode. Unless the mode is changed later to the stand-alone mode, a set item in the second image sensing set value table 200*b* is set in accordance with a set request from the information processing apparatus 160 In addition, image sensing is executed by looking up the second image sensing set value table 200*b*.

In the connection mode, an instruction supplied through the operating section 109 of the digital camera 100 is ignored. However, for functions essential for image sensing or functions which can not be operated from the information processing apparatus 160 side, the digital camera 100 operates in accordance with an instruction supplied through the operating section 109. Such functions include, e.g., focus lock, zooming, and shutter operation.

Information (flag) representing the mode set in step S1102 or S1103 is recorded in, e.g., a predetermined area of the DRAM 105 and referred to in executing each operation to confirm the mode.

In step S1104, information (e.g., a symbol) representing whether the current mode is the stand-alone mode or connection mode is displayed on a display section 111.

As described above, according to the third embodiment, the stand-alone mode and connection mode are prepared. When the setting source of a set item of the digital camera 100 is limited to one of the operating section 109 and information processing apparatus 160 in accordance with the selected mode, operation corresponding to the purpose of image sensing is enabled. Additionally, when information representing the selected mode is displayed on the display section 111, the user can be prevented from misconceiving the mode.

In addition, according to the third embodiment, when the stand-alone digital camera 100 is to be used (stand-alone mode), the digital camera 100 can be operated in accordance with set values set through the operating section 109 of the digital camera 100. When the digital camera 100 connected to the information processing apparatus 160 is to be used (connection mode), the digital camera 100 can be operated in accordance with set values set by the information processing apparatus 160.

Furthermore, according to the third embodiment, the image sensing set value table for the stand-alone mode and that for the connection mode are separately prepared. Hence, for example, when the mode is changed from the stand-alone mode to the connection mode and then to the stand-alone mode again, set values previously set in the stand-alone mode can be directly used.

Fourth Embodiment

The fourth embodiment of the present invention will be described below with reference to FIG. 1 and FIGS. 10 and 12. A digital camera 100 according to this embodiment has a first image sensing set value table 200*a* and second image sensing set value table 200*b* in a DRAM 105, as in the third embodiment.

In this embodiment, a set value in the first image sensing set value table 200*a* is set in accordance with an instruction supplied through an operating section 109, and a set value in the second image sensing set value table 200*b* is set in accordance with an instruction supplied from an information processing apparatus 160.

Figure 12:
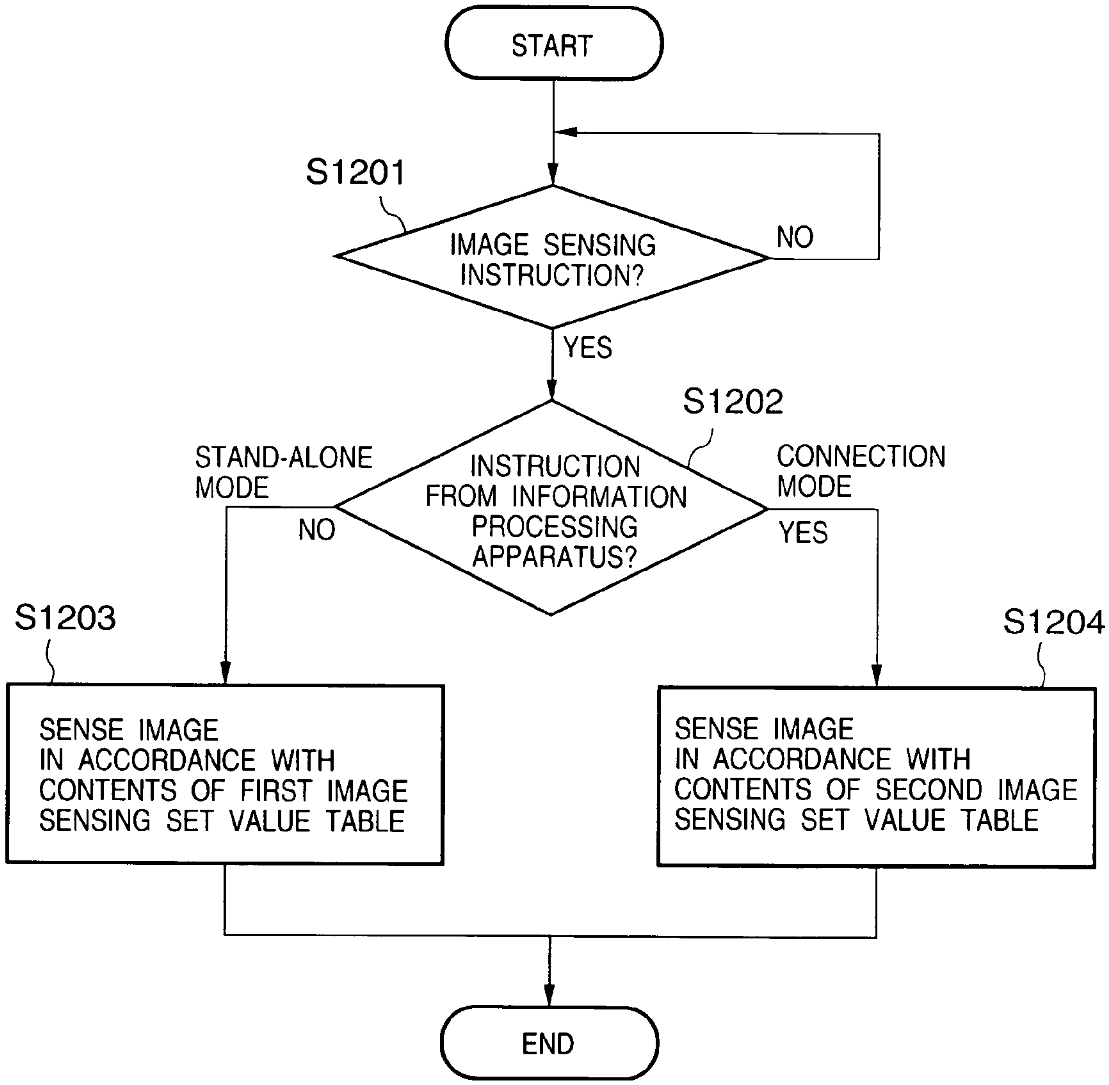
FIG. 12 is a flow chart showing the flow of image sensing operation according to the fourth embodiment of the present invention.

FIG. 12 is a flow chart showing the flow of image sensing operation according to the fourth embodiment of the present invention. Processing shown in this flow chart is controlled by a CPU 106 in accordance with a program stored in a ROM 107.

In step S1201, an image sensing instruction is waited for. When an image sensing instruction is received, it is determined in step S1202 whether the instruction is sent from a release switch 109*a* of the operating section 109 of the digital camera 100 or from the information processing apparatus 160.

If the image sensing instruction is sent from the operating section 109 of the digital camera 100, image sensing is executed in step S1203 in accordance with set values recorded in the first image sensing set value table 200*a* in which the set values are set through the operating section 109.

On the other hand, if the instruction is sent from the information processing apparatus 160, image sensing is executed in step S1204 in accordance with set values recorded in the second image sensing set value table 200*b* in which the set values are set through the information processing apparatus 160.

As described above, in the system of according to the fourth embodiment, the user can give an image sensing instruction either through the operating section 109 or through the information processing apparatus 160. When the image sensing instruction is given through the operating section 109, image sensing is executed in accordance with set values set by the operating section 109. When the image sensing instruction is given through the information processing apparatus 160, image sensing is executed in accordance with set values set by the information processing apparatus 160.

Hence, according to the fourth embodiment, one digital camera 100 can be used either as a digital camera like a digital camera which is exclusively used as a stand-alone digital camera or as a digital camera like a digital camera exclusively operated from the information processing apparatus 160.

Other Embodiment

The above-described embodiments are related to a digital camera for sensing a still image and/or moving image. However, the present invention can be applied to any camera including a silver halide film camera. In this case, the CCD 103, signal processing section 104, and CF card 108 are replaced with, e.g., a film. For the remaining part, the "digital camera" in each embodiment is replaced with a "silver halide film camera" or "camera".

The present invention can also be applied not only to a camera but also to any image input apparatus including a scanner. An example of an image input apparatus (e.g., scanner) to which the present invention is applied is an image input apparatus usable as a stand-alone apparatus or an apparatus connectable to an external apparatus. In this case, the "digital camera" in each embodiment is replaced with an "image input apparatus (e.g., scanner)".

The present invention can be applied not only to an image input apparatus but also to any electronic device including an information processing apparatus such as a computer or a portable terminal. An example of an electronic device to which the present invention is applied is an electronic device usable as a stand-alone device or a device connectable to an external apparatus. In this case, the "digital camera" in each embodiment is replaced with an "electronic device". Electronic devices include a silver halide film camera having a communication I/F and CPU as electronic components.

The present invention may be applied to a system constituted by a plurality of devices or an apparatus comprising a single device.

It should be noted that the present invention includes combinations of the aforesaid embodiments or technical elements disclosed therein.

The object of the present invention is realized even by supplying a medium such as a storage medium (or recording medium) storing software program codes for realizing the functions of the above-described embodiments to a system or apparatus, and causing the computer (or a CPU or MPU) of the system or apparatus to read out and execute the program codes. In this case, the program codes realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the medium are written in the memory of a function expansion board inserted into the computer or a function expansion unit connected to the computer, and the CPU of the function expansion board or function expansion unit performs part or all of actual processing on the basis of the instructions of the program codes.

According to the present invention, e.g., the convenience for use of an electronic device having a function of connecting an external apparatus can be improved.

As many apparently widely different embodiments of the present invention can be made without departing from the spirit and scope thereof, it is to be understood that the invention is not limited to the specific embodiments thereof except as defined in the appended claims.

What is claimed is:

1. An electronic device operating on the basis of a variable set value, comprising:

an operating section which inputs first setting instruction information for setting a parameter for a specific function of said device;

a reception section which receives second setting instruction information for setting the parameter for the specific function from an external apparatus; and a setting section which determines a set value on the basis of the first or second setting instruction information and sets the set value as the parameter of the specific function, wherein a set value which can be set by said setting section includes a set value to be set on the basis of only the second setting instruction information; and a display control section which controls a display section so as to display a specific index when the set value set by said setting section is not a set value which can be set in accordance with the first setting instruction information.

2. The device according to claim 1, wherein said display control section controls the display section so as to display at least part of the set value information corresponding to the set value determined by said setting section.

3. The device according to claim 1, further comprising a recorder which records an image on a recording medium in accordance with the set value set by said setting section.

4. The device according to claim 3, wherein the recording medium comprises a memory.

5. The device according to claim 3, wherein the recording medium comprises a film.

6. The device according to claim 1, wherein the device comprises a camera.

7. A method of controlling an electronic device having an operating section for inputting first setting instruction information for setting a parameter for a specific function of the device and a reception section for receiving second setting instruction information for setting the parameter for the specific function from an external apparatus, the method comprising:

a setting step of determining a set value on the basis of the first or second setting instruction information and setting the set value as the parameter of the specific function, wherein a set value which can be set in the setting step includes a set value to be set on the basis of only the second setting instruction information; and a display control step of controlling a display section so as to display a specific index when the set value set in the setting step is not a set value which can be set in accordance with the first setting instruction information.

8. A storage medium which stores a control program for controlling an electronic device having an operating section for inputting first setting instruction information for setting a parameter for a specific function of the device and a reception section for receiving second setting instruction information for setting the parameter for the specific function from an external apparatus, the control program comprising:

a setting step of determining a set value on the basis of the first or second setting instruction information and setting the set value as the parameter of the specific function, wherein a set value which can be set in the setting step includes a set value to be set on the basis of only the second setting instruction information; and a display control step of controlling a display section so as to display a specific index when the set value set in the setting step is not a set value which can be set in accordance with the first setting instruction information.

* * * * *

UNITED STATES PATENT AND TRADEMARK OFFICE

CERTIFICATE OF CORRECTION

PATENT NO. : 6,972,789 B1

APPLICATION NO. : 09/619890

DATED : December 6, 2005

INVENTOR(S) : Takashi Aizawa

It is certified that error appears in the above-identified patent and that said Letters Patent is hereby corrected as shown below:

On the Title Page at item [73], please delete Assignee name “Csnon Kabushiki Kaisha” and insert therefore --Canon Kabushiki Kaisha--

Signed and Sealed this

Tenth Day of October, 2006

JON W. DUDAS

*Director of the United States Patent and Trademark Office*